US008544626B2

(12) United States Patent
French

(10) Patent No.: US 8,544,626 B2
(45) Date of Patent: Oct. 1, 2013

(54) HIGH EFFICIENCY BICYCLE HUB

(71) Applicant: George French, Sheffield S. Yorkshire (GB)

(72) Inventor: George French, Sheffield S. Yorkshire (GB)

(73) Assignee: Bear Corporation, Norwalk, CA (US)

( * ) Notice: Subject to any disclaimer, the term of this patent is extended or adjusted under 35 U.S.C. 154(b) by 0 days.

(21) Appl. No.: 13/656,579

(22) Filed: Oct. 19, 2012

(65) Prior Publication Data

US 2013/0043102 A1    Feb. 21, 2013

Related U.S. Application Data

(62) Division of application No. 12/418,543, filed on Apr. 3, 2009, now Pat. No. 8,312,976.

(51) Int. Cl.
*F16D 41/26* (2006.01)
*F16D 41/32* (2006.01)

(52) U.S. Cl.
USPC .......... 192/46; 192/54.51; 192/64; 192/69.81

(58) Field of Classification Search
USPC ..................................... 192/46, 64
See application file for complete search history.

(56) References Cited

U.S. PATENT DOCUMENTS

| | | | |
|---|---|---|---|
| 2,799,183 A | 7/1957 | Rhain et al. | |
| 3,113,472 A | 12/1963 | Schwerdhofer | |
| 3,557,922 A | 1/1971 | Schwerdhoffer | |
| 4,229,997 A | 10/1980 | Schwerdhofer | |
| 4,711,331 A | 12/1987 | Hoffmann | |
| 5,024,121 A | 6/1991 | Hsieh | |
| 5,433,306 A | 7/1995 | Yang | |
| 5,458,223 A | 10/1995 | Chen | |
| 5,515,957 A * | 5/1996 | McConaghy | 192/64 |
| 5,964,332 A * | 10/1999 | King | 192/64 |
| 6,155,394 A | 12/2000 | Shook | |
| 6,202,813 B1 | 3/2001 | Yahata et al. | |
| 6,502,679 B1 | 1/2003 | Wang | |
| 6,516,931 B2 * | 2/2003 | Kroger | 192/64 |
| 6,607,465 B1 | 8/2003 | Shoge | |
| 7,445,105 B2 | 11/2008 | French | |
| 7,559,416 B2 | 7/2009 | French | |
| 7,562,755 B2 * | 7/2009 | Spahr | 192/64 |

(Continued)

FOREIGN PATENT DOCUMENTS

DE    741943    10/1943

OTHER PUBLICATIONS

U.S. Appl. No. 11/674,813, filed Aug. 14, 2008, Kamiay et al.
U.S. Appl. No. 11/490,162, filed Jan. 24, 2008, Kanehisa.
U.S. Appl. No. 10/635,553, filed Jul. 7, 2003, Hsu.
U.S. Appl. No. 09/820,829, filed Oct. 3, 2002, Wang

*Primary Examiner* — David D Le
*Assistant Examiner* — Jacob S Scott
(74) *Attorney, Agent, or Firm* — Cislo & Thomas, LLP

(57) ABSTRACT

A high efficiency bicycle hub for near frictionless free wheeling comprising a hub having a toothed engagement ring, a driver having a retractable engagement member that can engage and disengage from the hub, and a retraction device to facilitate a disengaged configuration. The retraction device comprises a retaining ring having retraction members and the retractable engagement member comprises reciprocal retraction members to "catch" the retraction member to maintain a disengaged configuration. In use, forward rotation of the driver engages the retractable engagement member with the toothed engagement ring of the hub to drive the hub. Reverse rotation of the driver rotates the reciprocal retraction members underneath or behind the retraction member thereby disengaging the driver from the hub.

15 Claims, 15 Drawing Sheets

(56) References Cited

U.S. PATENT DOCUMENTS 7,938,241 B1 5/2011 Chen
7,938,242 B2 5/2011 Chen
2007/0240960 A1 10/2007 French \* cited by examiner

HIGH EFFICIENCY BICYCLE HUB

CROSS-REFERENCE TO RELATED APPLICATION

This patent application is a divisional of U.S. patent application Ser. No. 12/418,543, filed Apr. 3, 2009, entitled "High Efficiency Bicycle Hub," which application is incorporated in its entirety here by this reference.

TECHNICAL FIELD

The present invention relates generally to bicycles, and more particularly, to a chain wheel assembly and a hub assembly using the same for a bicycle.

BACKGROUND

Referring to FIG. 1, a conventional bicycle hub 10 is composed of a shell 12, a chain wheel 14, a plurality of pawls 16, and a plurality of tongues 18. The shell 12 includes an axial hole 122, an arbor 124 coaxially inserted into the axial hole 122, and a plurality of indentations 126 formed on an internal sidewall of the axial hole 122. The chain wheel 14 is sleeved onto the arbor 124, having an annular stub 142 engaging the axial hole 122 and a plurality of concavities 144 formed on an external periphery of the annular stub 142. Each of the pawls 16 is pivotably mounted to an end of one of the concavities 144 and stopped against one of the indentations 126. Each of the tongues is mounted to the other end of the concavity 144 and stopped against one of the pawls 16.

When a user treads pedals of a bicycle to drive the chain wheel 14 to rotate forward through a chain, each of the pawls 16 pushes against the indentations 126 to drive rotation of the shell 12, as shown in FIG. 2, whereby the bicycle wheel is rotated forward to drive the bicycle to move forward.

Bicycles are very efficient machines. They allow a rider to cover relatively large distances at a faster pace than walking, and a cyclist is enabled to perform the task with the expenditure of less energy overall. By comparison, cyclists have a relatively limited supply of energy when measured against a vehicle using an internal combustion engine, and because only the rider is capable of producing the energy needed to propel the bicycle, it is therefore desirable to keep the bicycle's efficiency at its absolute maximum.

Most bicycles are fitted with some form of over-running mechanism, such as a "freewheel" that will allow the rider to "coast" (stop pedaling) while the forward motion of the bicycle continues. Such as the one described above. However, all such existing mechanisms also introduce an additional amount of drag on the wheel and therefore they lessen the bicycle's overall efficiency.

These over-running mechanisms can be grouped into two broad categories. The first types are those that introduce drag when the rider is coasting. These designs are by far the most commonly used, with the traditional ratchet mechanism being the predominant style. When the cyclist applies power to a traditional ratchet, the mechanism does not add significant drag (above that within the bearings of the drive mechanism to the axle) because the cogged driver moves with the wheel, and, as a result there is no relative movement between the elements. However, when the rider chooses to "freewheel", the cogged driver then becomes stationary as the wheel continues to rotate. This onward rotation of the wheel requires the ratchet pawls to be rubbing continually against the inside faces of a toothed engagement ring, and this action introduces sliding friction. Additionally, during freewheeling the ratchet pawls are forced to oscillate radially as each engagement ring "tooth" moves past because the ratchet pawls are being biased outwardly by their springs. In this example, the wheel will have to "give" energy to the pawl to accelerate it radially inwards and it must also "give" energy in order to compress the pawl springs. As a result, this energy is also "lost" as it is converted into heat and sound.

One may easily demonstrate these energy losses by turning a bicycle upside-down and spinning the front and rear wheels to simulate forward motion. The rear wheel will come to a halt far more quickly than the front wheel, which does not have to cope with these additional losses. These energy losses are not present when the rider is pedaling, but in both leisure and competition use there are many times in which a rider will choose to coast, such as when riding downhill or when "drafting" behind another cyclist in the racing "peloton" (a large group of cyclists traveling together). For example, it has been estimated that a bicycle racer participating in a stage of the Tour de France may "coast" for 20-25% of the time when traveling in the draft of the "peloton" during a typical stage that occurs in the first week of the event. In a sport where conserving energy is a critical component to achieving victory, it becomes clear that it is very desirable to create gains in efficiency wherever possible.

Hubs that employ a clutch rather than a ratchet mechanism are also available but are used with far less frequency. In these hubs, forward movement the driver relative to the axle will cause a clutch element to move into frictional engagement with the hub of the wheel. Unlike with the ratchet mechanism, these hubs will disengage the driver from the wheel entirely when the rider back-pedals slightly, and as such these hubs will coast without additional friction from the drive mechanism. If a bicycle equipped with the clutch device is turned upside down, the front and back wheels will spin equally and freely when rotated to simulate forward motion. However, drag must remain present at all times when the rider is pedaling because these mechanisms rely on drag between the clutch mechanism and the axle in order to engage the wheel's hub. Due to drag being present, a significant amount of the rider's energy is constantly being lost to drag whenever pedaling occurs. For this reason, these hubs are generally only used on bicycles in which efficiency is not of paramount importance.

Thus, there is still a need for a bicycle drive mechanism in which it is possible for the wheel to over-run or coast with minimal to no energy being lost to the drive mechanism, and for the drive mechanism to in an engaged state with no additional energy losses. More succinctly, the goal is to create a drive mechanism that is more efficient in its overall use than the existing designs that are available.

SUMMARY

The high-efficiency hub comprises a hub running on an axle, the hub having a toothed engagement ring fitted internally that is capable of transferring power to the wheel; a driver mounted to the axle which holds a plurality of pawls that are biased outwards by individual springs mounted underneath each pawl; and a retraction device having a retraction member. Each pawl may have a curved tip that engages with the mating "teeth" of the hub's engagement ring.

In addition, each pawl incorporates a unique reciprocal retraction member on the pawl's innermost side or medial side to engage the retraction member of the retraction device. The retraction device further comprises a retaining ring to limit the movement of the retraction members by a circumferential stop to prevent the retraction members from moving outward beyond a certain distance. This retraction device is frictionally engaged to the axle such that the retraction device can apply a small torsional resistance before rotating about the axle in either direction.

In use, as the rider pedals forward, the driver is driven in a clockwise direction. Springs under the retractable engagement members bias them outward and each retractable engagement member is driven against the driving faces of the engagement ring at which point drive is achieved. The hub will continue to transfer drive in a conventional manner as long as the driver is being driven forward at a higher rate than the rotational speed of the wheel. Due to the unique geometry of the curved tip and mating curved engagement ring tooth profile, once partially engaged each retractable engagement member will tend to fully outward to the total extent of its travel. This ensures that each of the retractable engagement member will be clear of the retraction device.

When the rider stops pedaling the engagement member will become stationary relative to the axle. At this time the engagement member may or may not be radially aligned with the retraction member. In the condition that they are not aligned (which is most likely to be the common outcome) then the engagement member will oscillate radially, due to the bumping against the teeth of the engagement ring in the ordinary manner and energy will be conventionally "lost" from the system in the form of heat and noise as the springs under the engagement members attempt to hold the engagement members against the passing engagement ring teeth. In the condition that the engagement members are aligned with a set of the retraction members, the engagement members will oscillate radially in the conventional manner and energy will be lost, but this energy will be greater as both the spring and the retraction member will attempt to bias the engagement member outward with greater combined force and therefore greater losses. However, in this condition each movement of the engagement members will create a resultant thrust and vibration that will tend to drive the retraction device onwards in a clockwise rotation until the retraction members no longer bear on each engagement member and losses drop to the normal level. Thus, in summary, a rider may pedal and coast in entirely the same way that a standard ratchet and pawl mechanism in a hub works.

However, when the rider has stopped pedaling and he or she backpedals slightly, the retraction device will operate. As the rider backpedals, the pawls that are riding over the teeth of the engagement ring will spend the majority or all of their time so the reciprocal retraction members sweep the volume of space occupied by the retraction member in a counter-clockwise direction. In this direction, the reciprocal retraction members can catch under the opposing retraction members of the retraction device and can be driven radially inwards as the top of the reciprocal retraction members slide under the retraction member. The retraction members cannot be forced outwards because they rest under the lip of the retaining cup. When the engagement member has been fully retracted and is no longer bearing against the engagement ring, any continued backpedaling motion will simply drive the retraction device backward in synchronization with the driver. In this condition, the drive mechanism will be entirely disengaged and the wheel will spin freely and silently without any energy losses due to the drive mechanism.

When the rider chooses to reintroduce energy into to the system, forward motion of the driver will allow the reciprocal retraction member to move outward from under the retraction member as the retraction device is held in light frictional engagement to the axle. When the engagement members move outward, they will become free to operate under their conventional range of motion and can now continue in pedal-based driving engagement as before.

In some embodiments, the driver disengages from the engagement ring in an axial manner.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
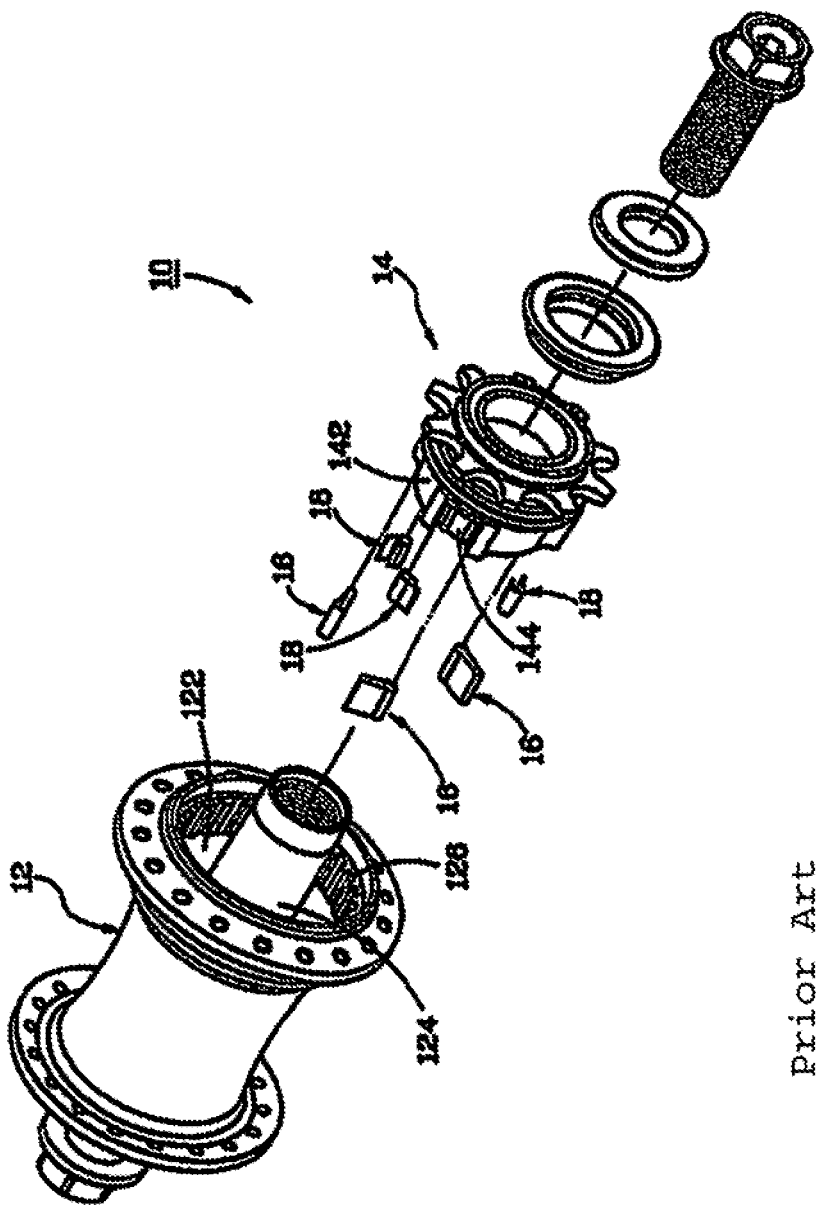
FIG. 1 shows an exploded view of a conventional bicycle hub.
Figure 2:
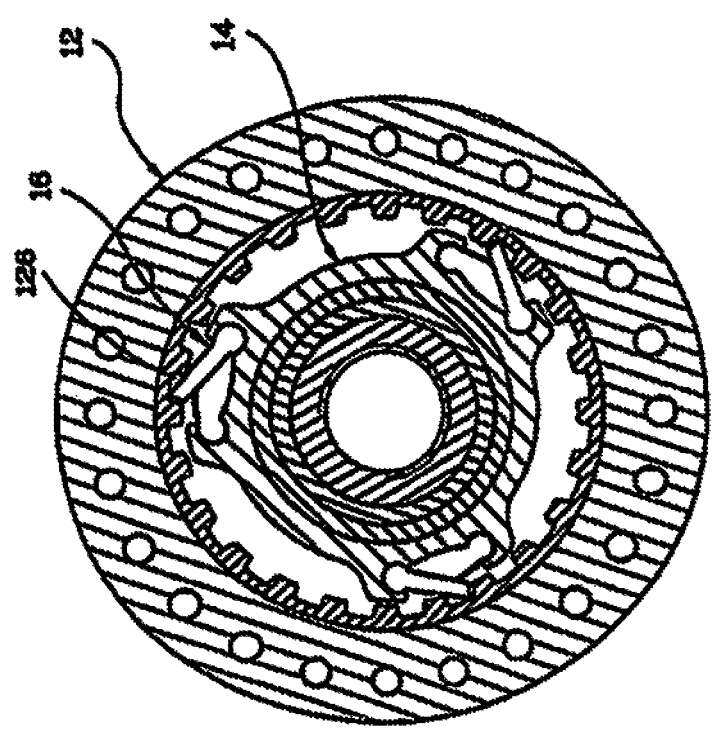
FIG. 2 shows a sectional view of the conventional bicycle hub.
Figure 3:
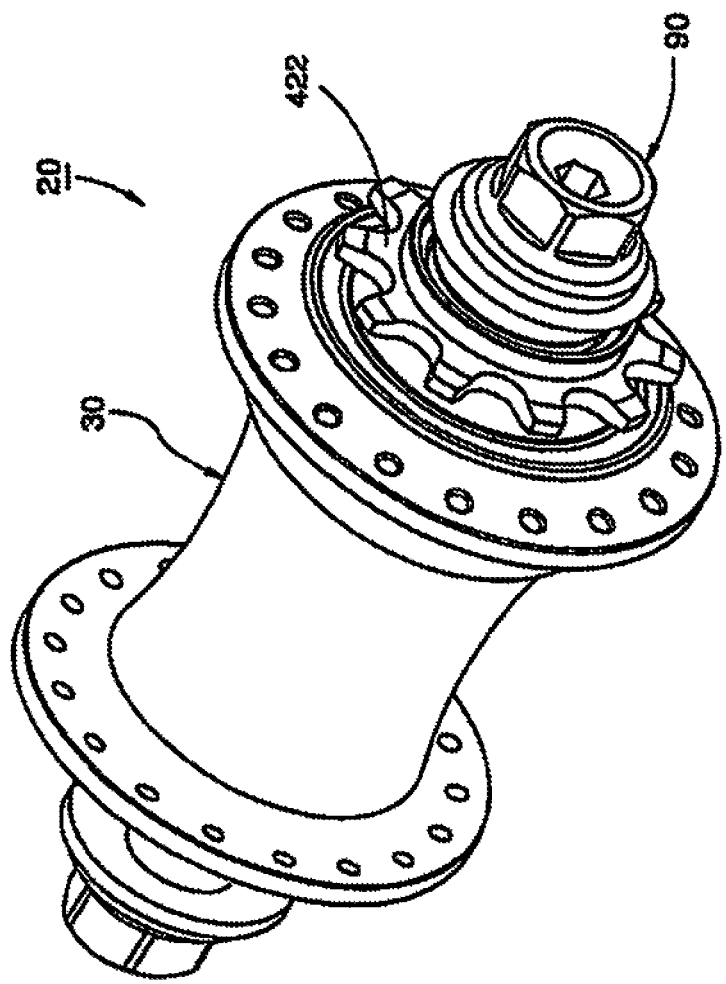
FIG. 3 shows a perspective view of an embodiment of the present invention.
Figure 4:
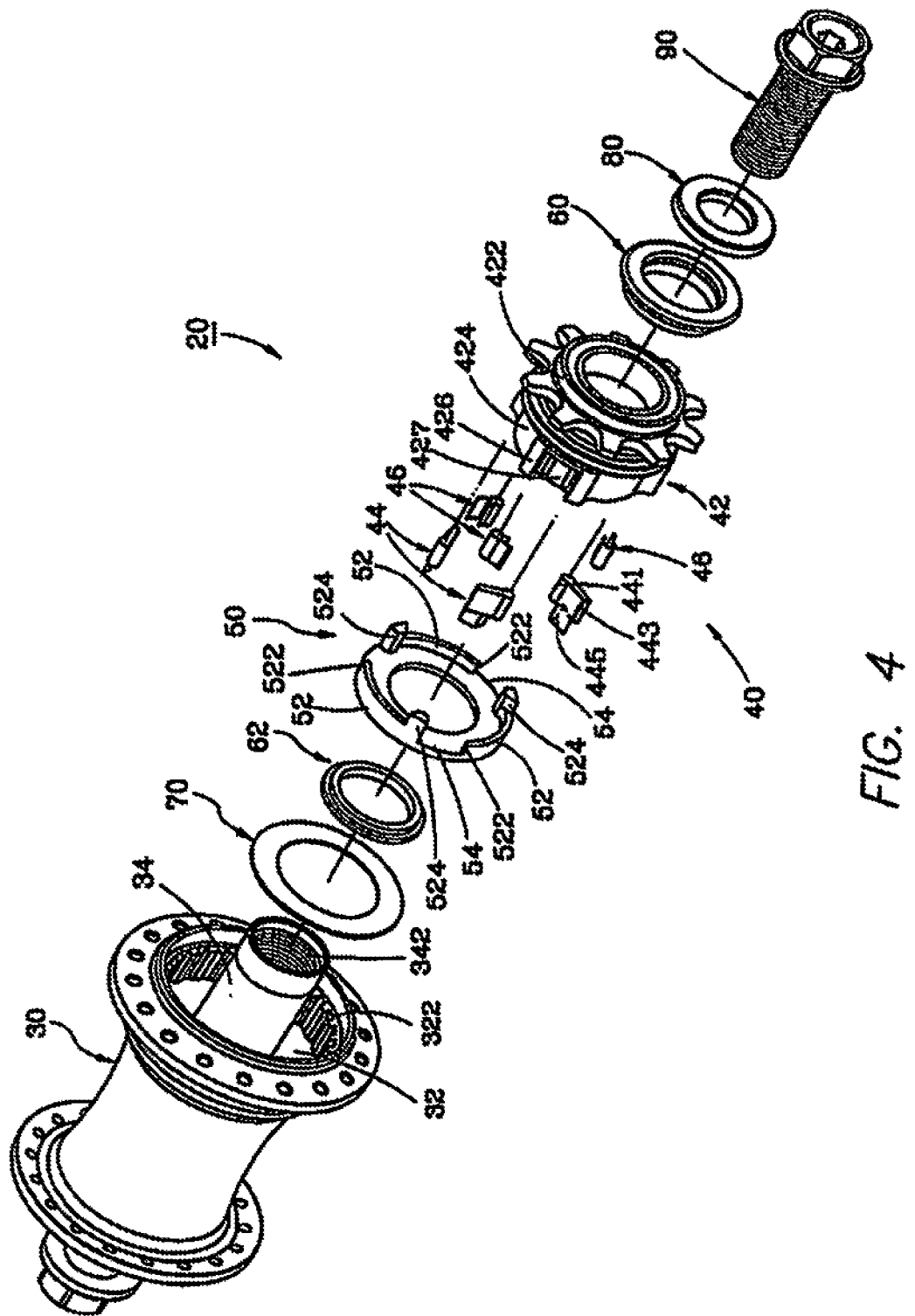
FIG. 4 shows an exploded view of the embodiment shown in FIG. 3.

Referring to FIGS. 3-4, in one embodiment, a bicycle hub assembly 20 constructed according to an embodiment of the present invention comprises a shell 30, a chain wheel assembly 40, a retaining ring 50, two axial rings 60 and 62, a springy member 70, a washer 80, and a threaded rod 90.

The shell 30 includes an axial hole 32 and an axle 34 coaxially inserted into the axial hole 32. The axial hole 32 has a plurality of indentations 322 radially recessed from an internal sidewall thereof. The axle 34 has an internal thread 342 formed on an internal sidewall thereof to receive the threaded rod 90.

Figure 5:
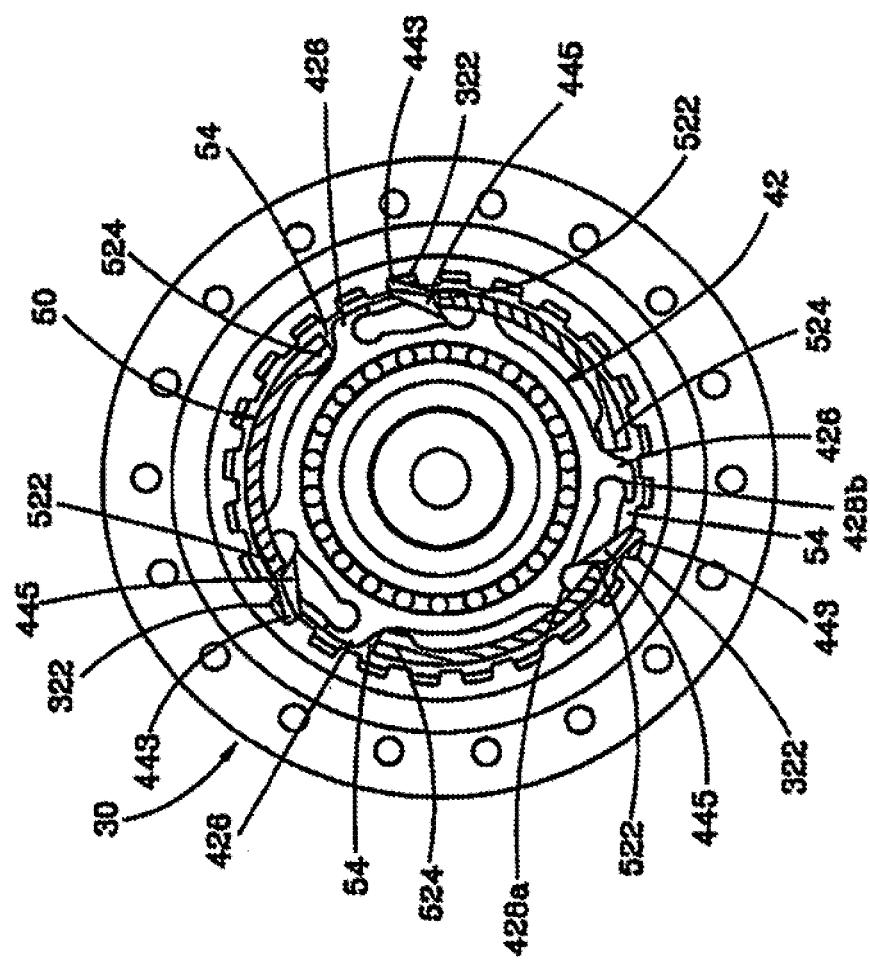
FIG. 5 shows a sectional view of the embodiment shown in FIG. 3, illustrating that the chain wheel is rotated forward.

The chain wheel assembly 40 includes a chain wheel 42, a plurality of pawls 44 serving as retractable engagement members to engage the shell 30, and a plurality of tongues 46. The chain wheel 42 includes a wheel disk 422 for engaging a chain (not shown). When the chain is driven to rotate the wheel disk 422, the chain wheel 42 can be rotated together. The chain wheel 42 includes an annular body 424 connected with the wheel disk 422. The annular body 424 has three receiving portions 426 protruding outward from an external periphery thereof and integrally and angularly arranged about the periphery. Each of the receiving portions 426 has a concavity 427. Each of the concavities 427 has two internal recessions 428a and 428b each formed at one of two ends thereof. As shown in FIG. 5, the internal recessions 428a and 428b in each of the concavities 427 are symmetrical. The chain wheel 42 is coaxially sleeved onto the axle 34 in such a way that the annular body 424 is inserted into the axial hole 32; meanwhile, the external periphery of the annular body 424 corresponds to the internal periphery of the axial hole 32.

Each of the pawls 44 includes a pivot portion 441, a tip 443, and a lug 445. Each of the pivot portions 441 is pivotably attached to the internal recessions 428a. Each of the tips 443 is connected with one of the pivot portions 441, engaging one of the indentations 322. While the chain wheel 42 is driven by a chain for rotation, the tips 443 of the ratchets 44 push against sidewalls of the indentations 322 to drive the shell 30 to rotate. Each of the lugs 445 is connected with one lateral side of one of the pivot portions 441 having a bevel 447.

Each of the tongues 46 is curved, having one end mounted to the other internal recession 428b of the concavity 427 and the other end thereof stopped against the tip 443 of one of the ratchets 44 in such a way that the tips 443 can be pushed against the sidewalls of the indentations 322.

The retaining ring 50 is coaxially sleeved onto the annular body 424 of the chain wheel 42, having three stopping walls 52 and three notches 54. The stopping walls 52 and the notches 54 are arranged alternately. Each of the stopping walls 52 has a first stopping end 522 and a second stopping end 524. Each of the second stopping ends 524 is longer than the first stopping end 522.

The axial rings 60 and 62 are sleeved onto the arbor 34 of the shell 30. The axial ring 60 is stopped against the wheel disk 422 and the axial ring 62 is stopped against the retaining ring 50.

The springy member 70 is sleeved onto the axle 34 and stopped against the retaining ring 50 to apply slight torsional resistance against the retaining ring 50.

The washer 80 is sleeved onto the arbor 34 and stopped against the axial ring 60.

The threaded rod 90 is inserted into the chain wheel assembly 40 to be threaded with the internal thread 342 of the arbor 34 for fixing the chain wheel assembly and the shell 30 together.

When a cyclist treads bicycle pedals to drive the chain wheel 42 to rotate forward via the chain, as shown in FIG. 5, each of the tips 443 of the ratchets 44 protrudes out of the notch 54 to engage the indentation to drive the shell 30 to rotate in step with the chain wheel 42. In this way, the bicycle wheel can be rotated to drive the bicycle to move forward. In the meantime, each of the receiving portions 426 of the chain wheel 42 pushes against the second stopping end 524 of the retaining ring 50 to drive the retaining ring 50 to rotate in step with the chain wheel 42.

Figure 6:
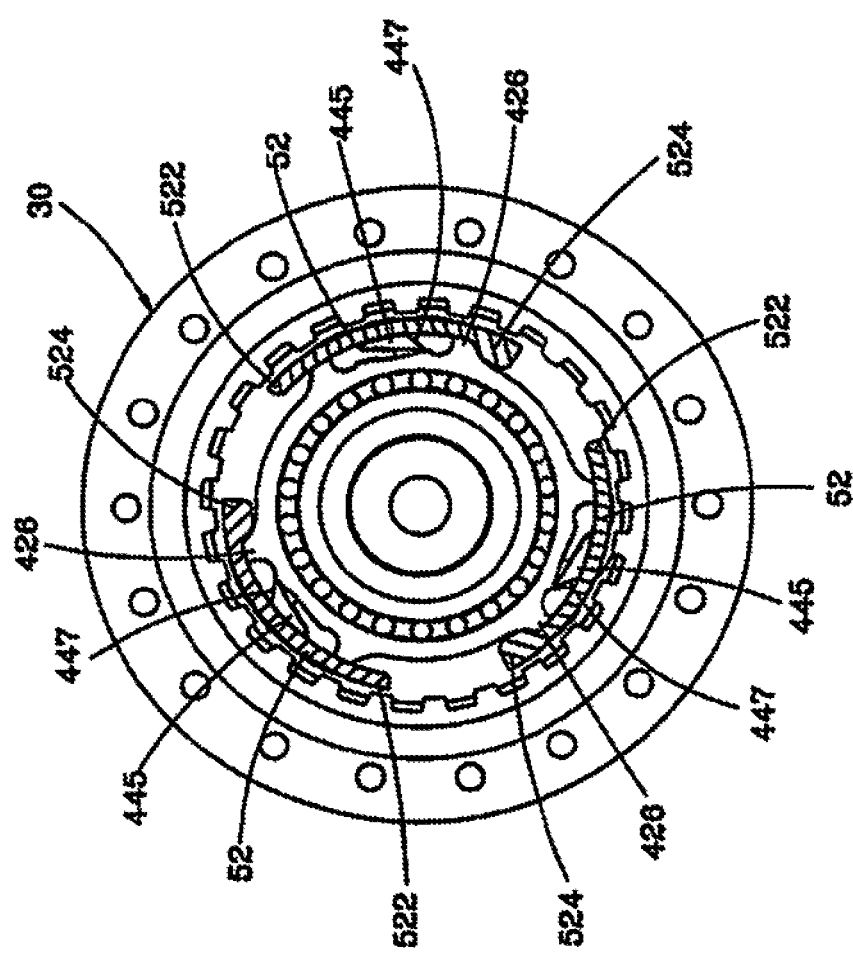
FIG. 6 shows another sectional view of the embodiment shown in FIG. 3, illustrating the chain wheel rotating reversely.

When the bicycle is moved backward, the sidewalls of the indentations 322 push against the tips 443 to drive the chain wheel 42 to rotate reversely and then the first stopping ends 522 press the bevels 447 of the lugs 445 to drive the ratchets 44 to pivot respectively and to disengage from the indentations 322. At the same time, the ratchets 44 are pressed by the stopping walls 52 respectively and the receiving portions 426 are stopped against the second stopping ends 524 respectively, as shown in FIG. 6.

Figure 7:
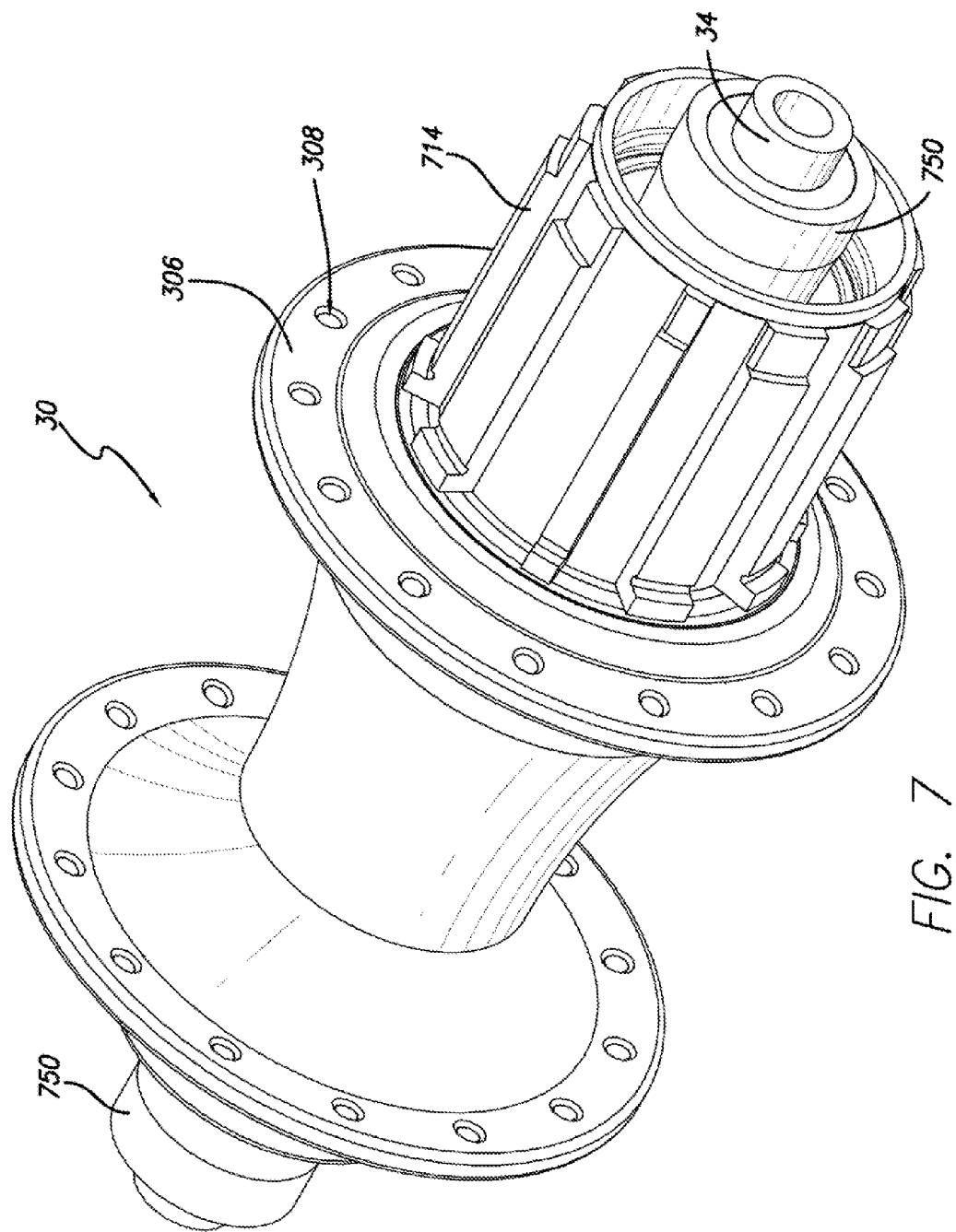
FIG. 7 shows a perspective view of another embodiment of the present invention.
Figure 8:
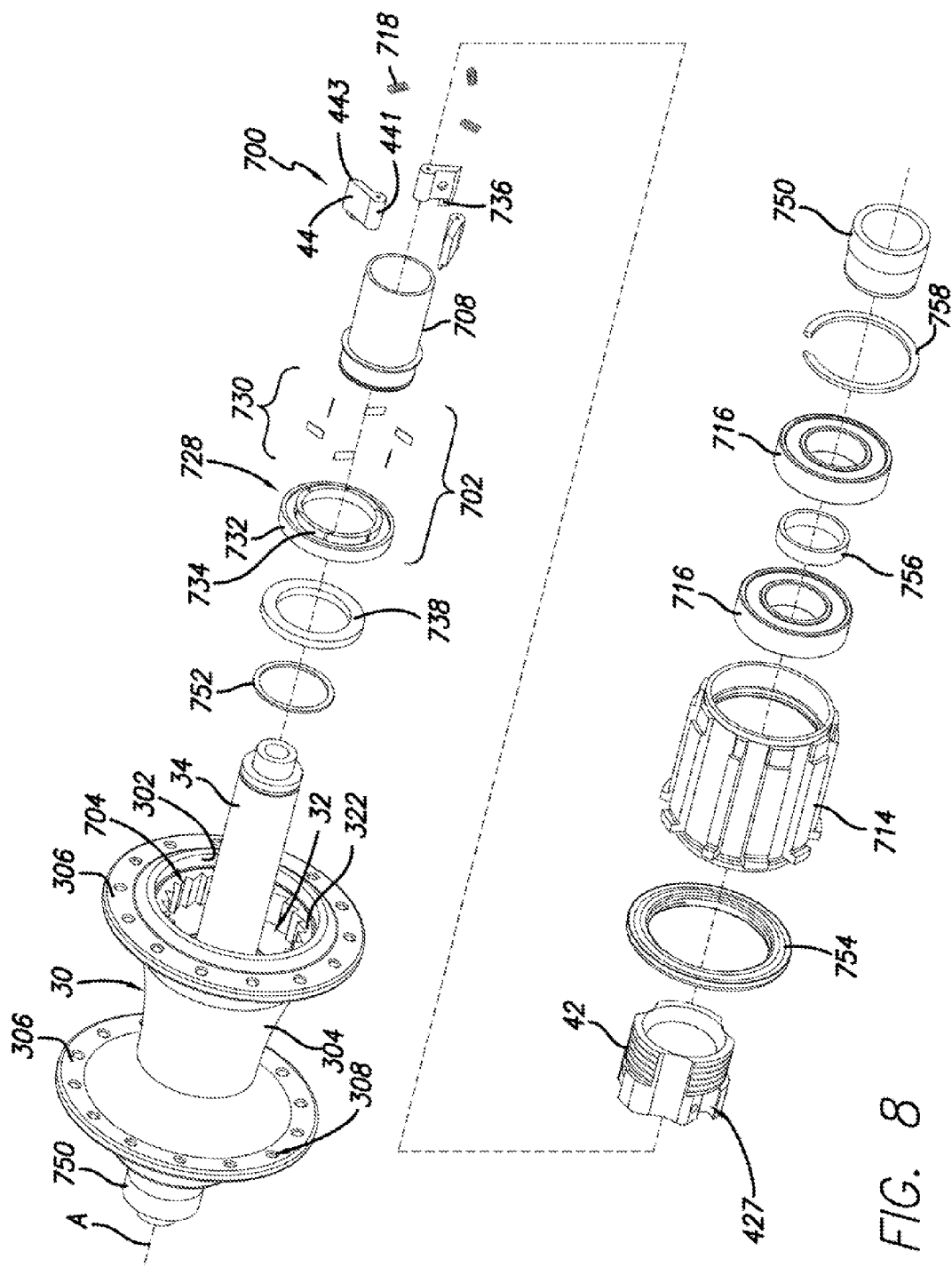
FIG. 8 shows an exploded view of another embodiment of the present invention.
Figure 9A:
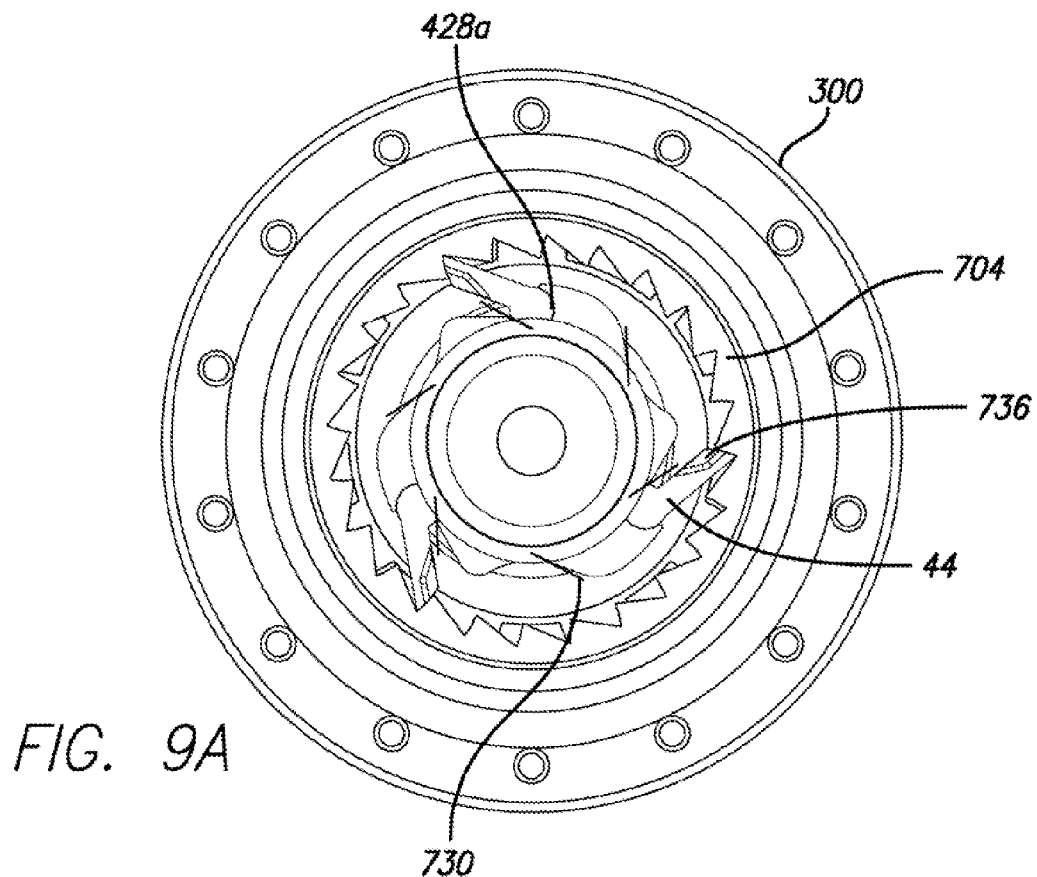
FIG. 9A shows a side view of the embodiment shown in FIG. 8 in the engaged configuration.
Figure 9B:
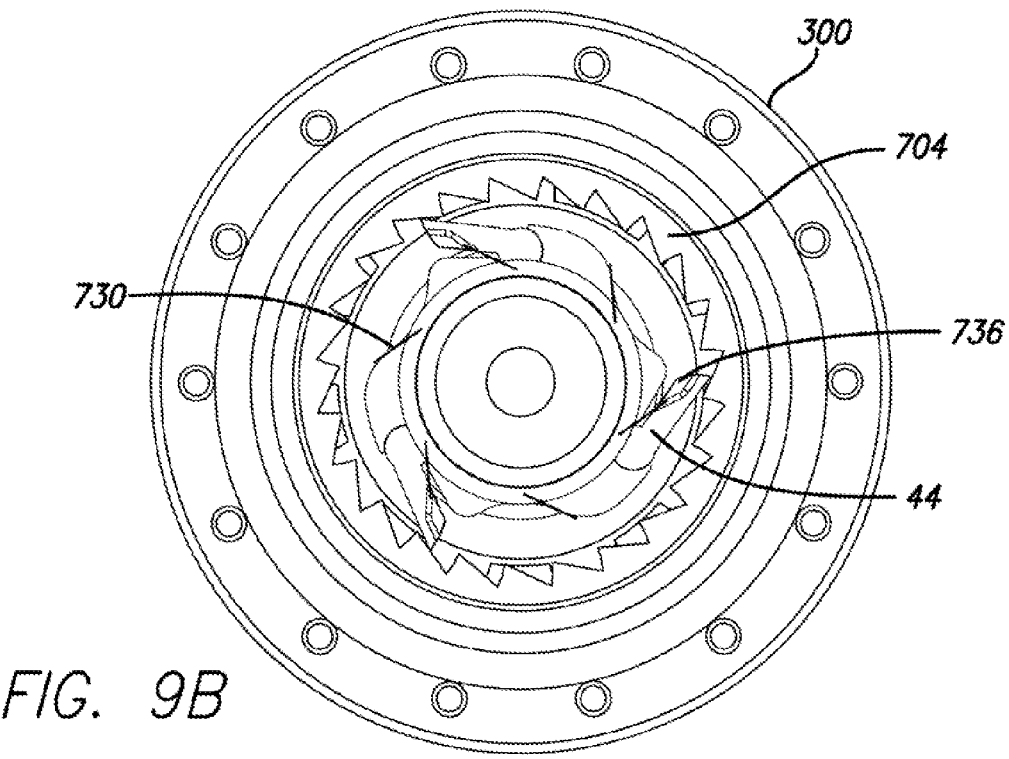
FIG. 9B shows a side view of the embodiment shown in FIG. 8 in the disengaged configuration.
Figure 10A:
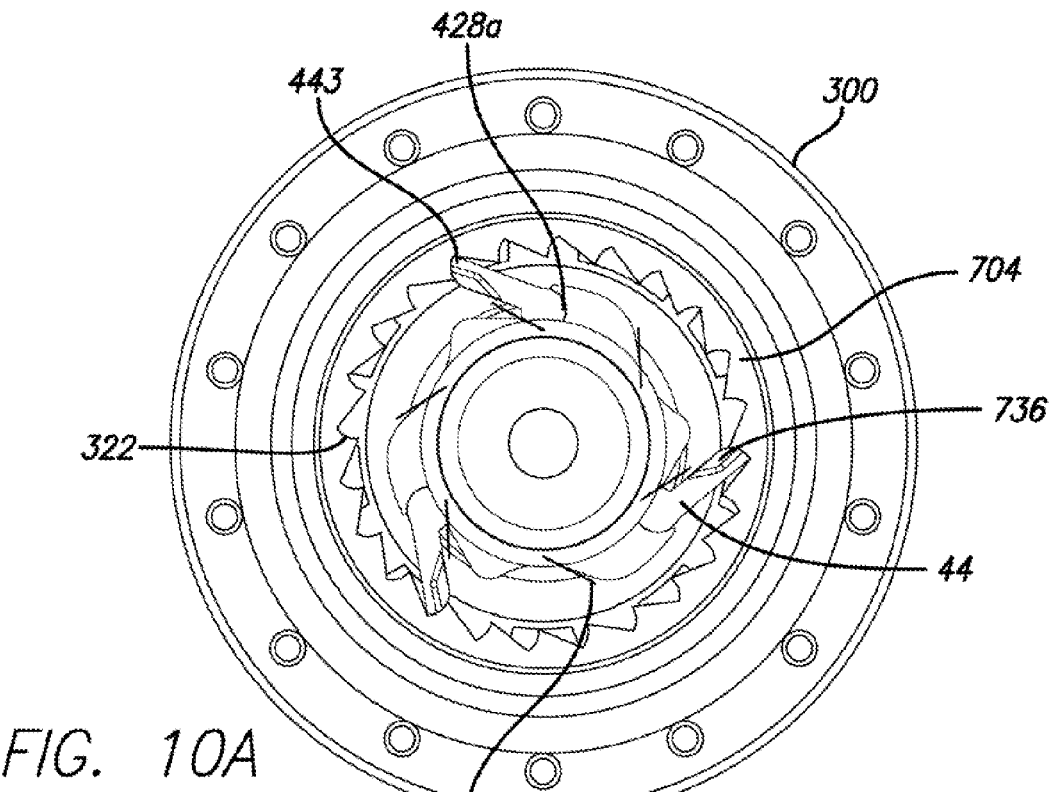
FIG. 10A shows a side view of another embodiment in the engaged configuration.
Figure 10B:
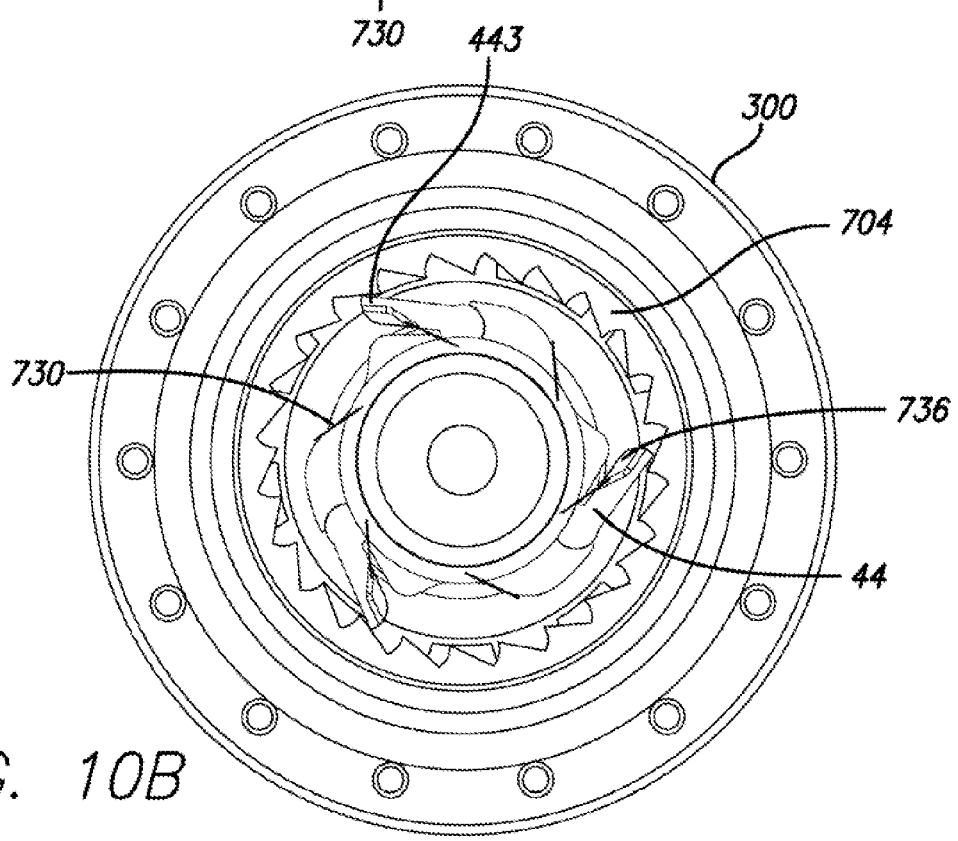
FIG. 10B shows a side view of the embodiment in FIG. 10A in the disengaged configuration.
Figure 12:
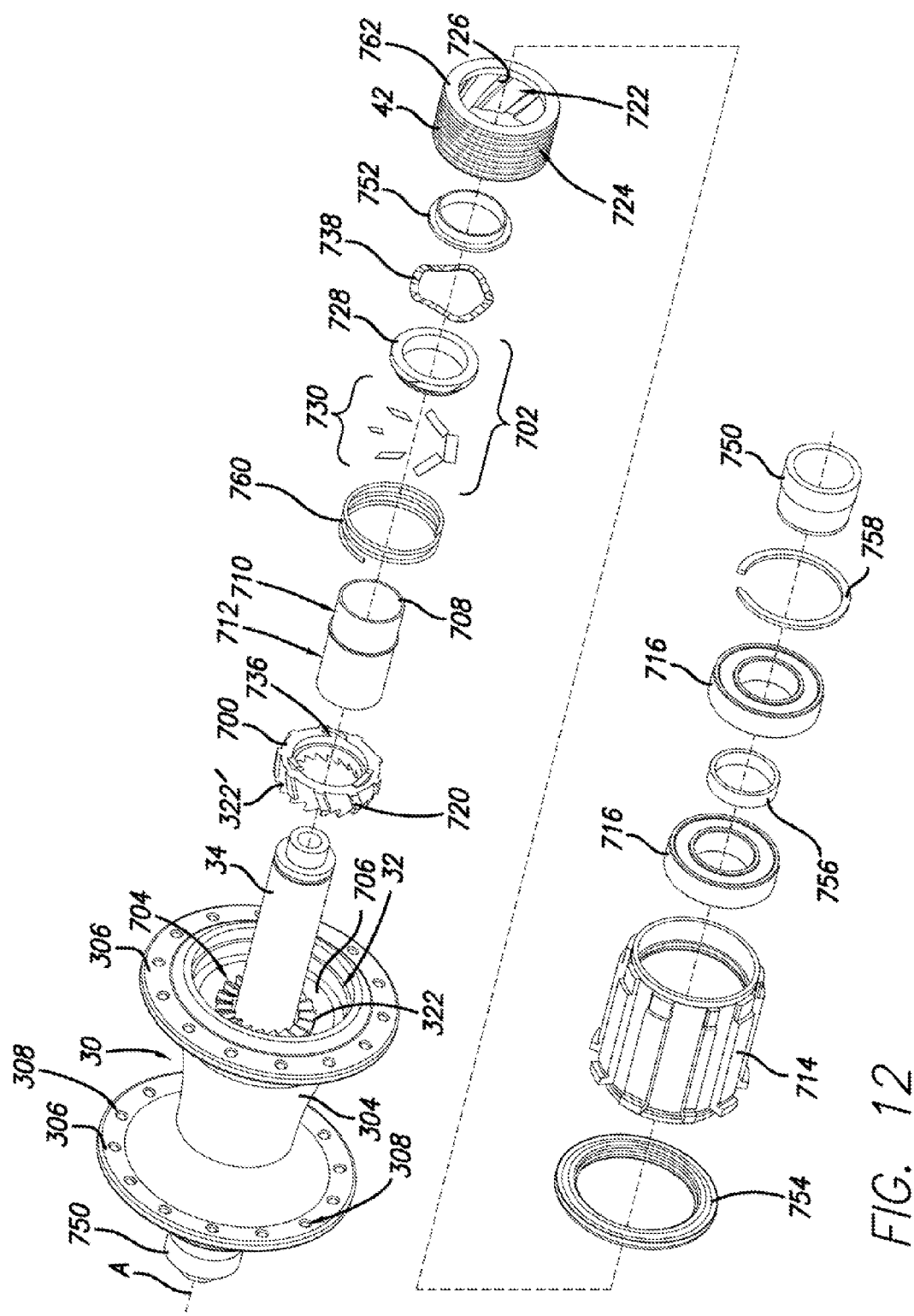
FIG. 12 shows an exploded view of another embodiment of the present invention.
Figure 13:
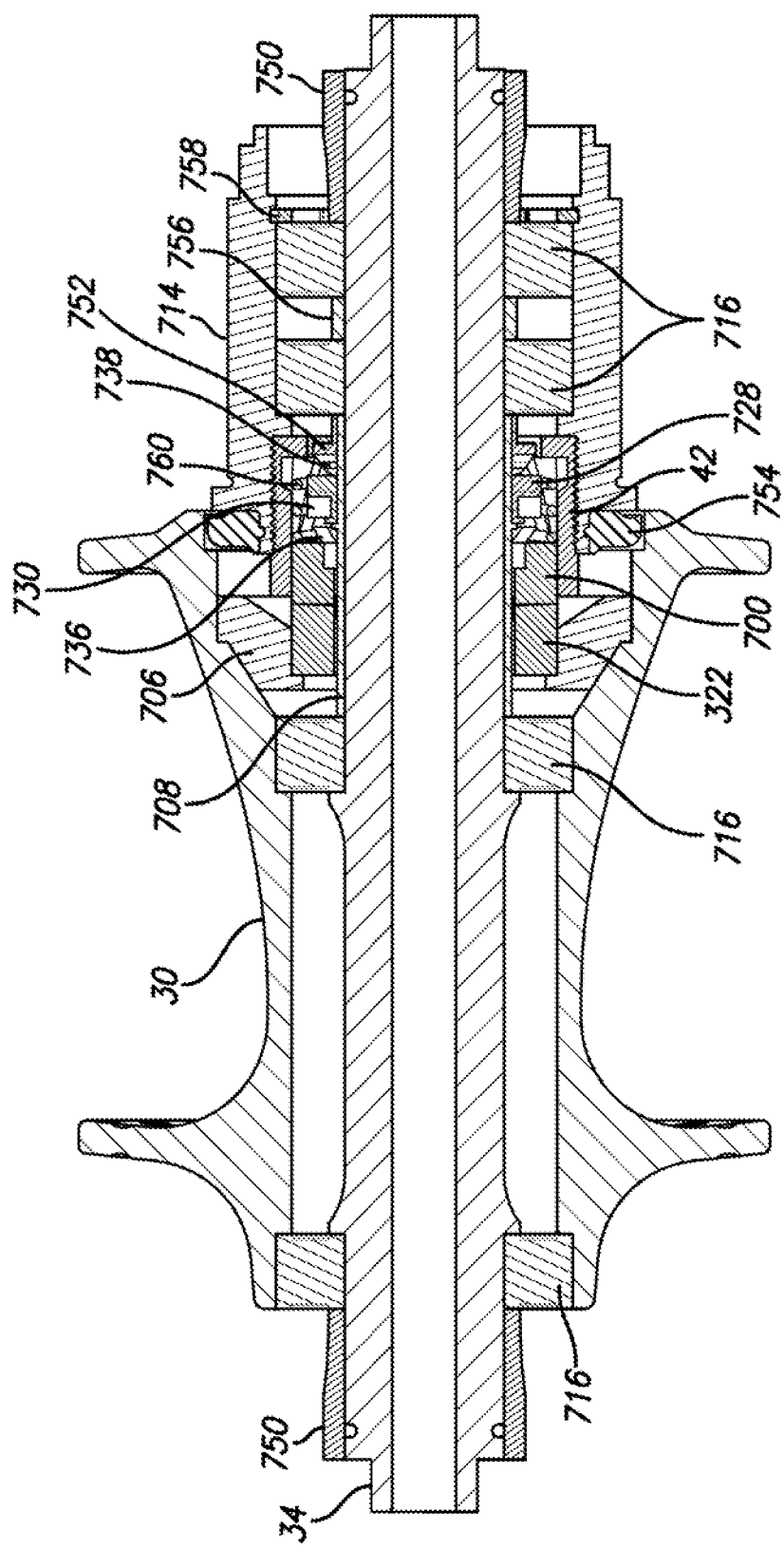
FIG. 13 shows a sectional view of the embodiment shown in FIG. 12 in the engaged configuration.
Figure 14:
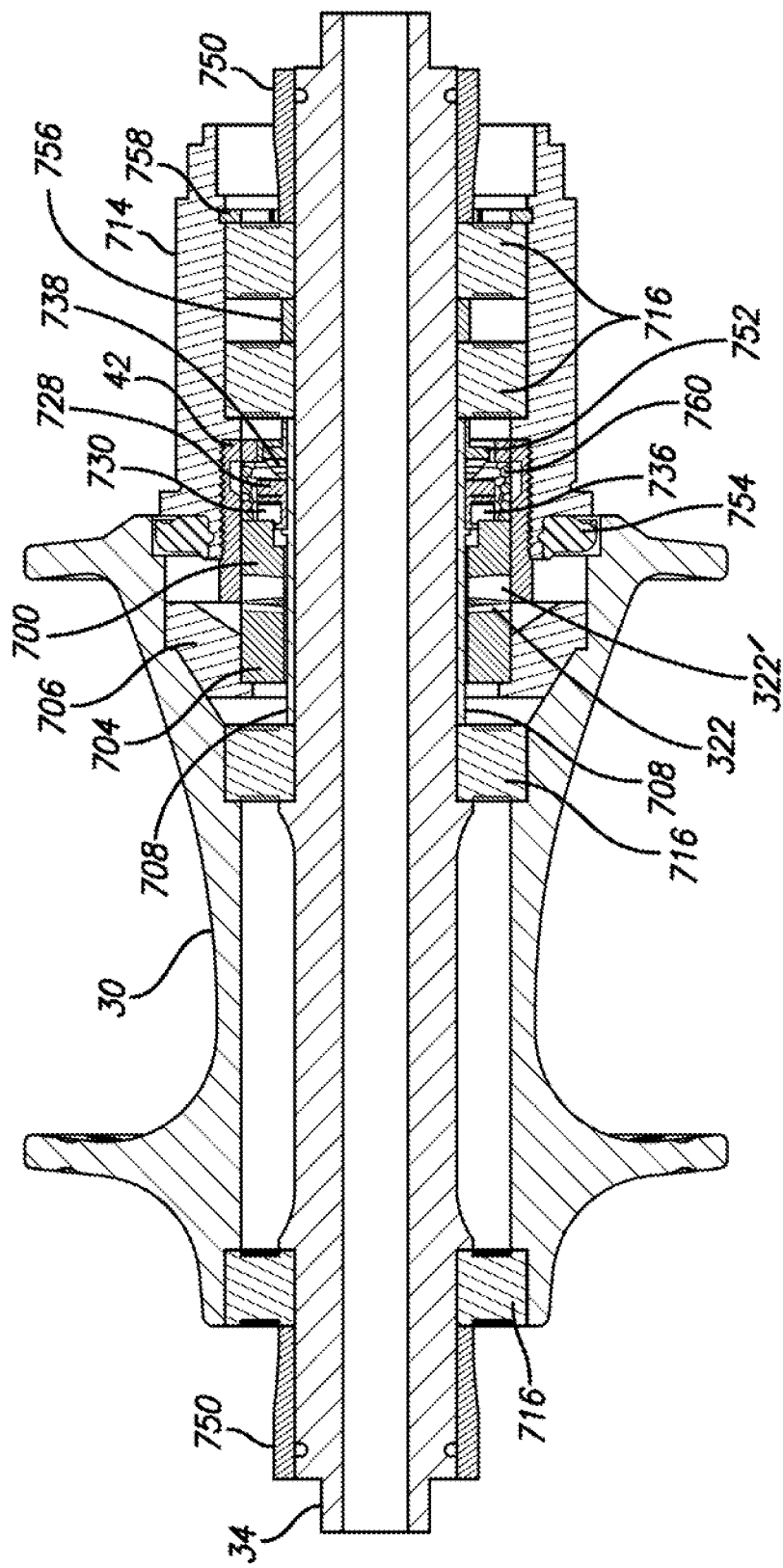
FIG. 14 shows a sectional view of the embodiment shown in FIG. 12 in the disengaged configuration.
Figure 15:
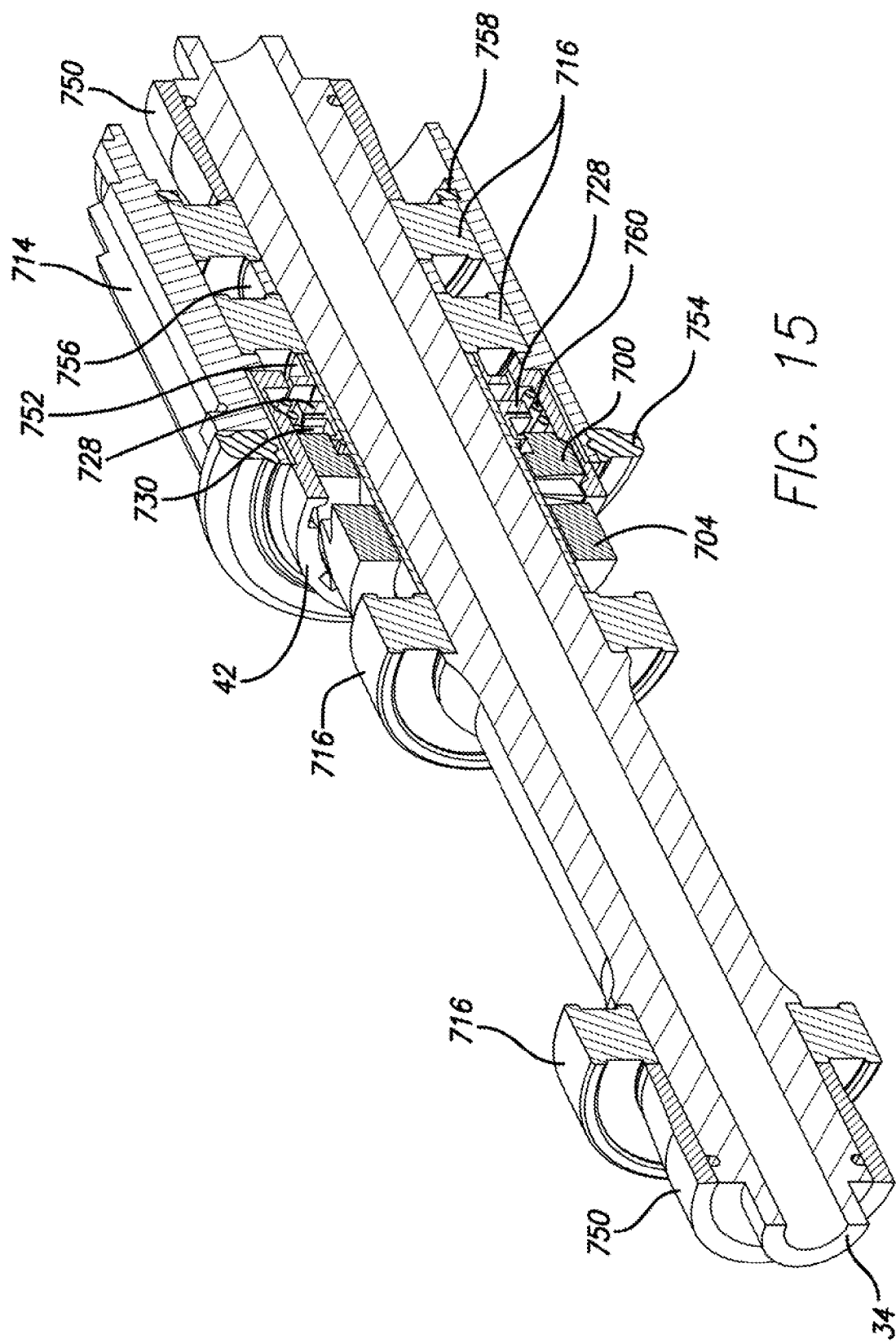
FIG. 15 shows perspective sectional view of the present invention.

In another embodiment of the invention, as she in FIGS. 7, 8, and 12 the high-efficiency hub assembly comprises a hub shell 30 running on an axle 34, a driver 42 rotatably mounted to the axle 34 which holds a retractable engagement member 700 that operatively engages and drives the hub 30, and a retraction device 728 that facilitates the retraction of the retractable engagement member 700 to disengage from the hub 30 and allow the hub 30 to freewheel in a near frictionless state. It is noted that a complete frictionless state cannot be achieved, except in a vacuum. Therefore, a near frictionless state refers to the extent a frictionless state can be achieved using bearings and the like to eliminate all non-negligible frictional forces except those imparted by the bearings.

The hub shell 30 has a generally cylindrical body having a central axis A, an inner peripheral surface 302 defining an axial hole 32 and an outer peripheral surface 304. The lateral portions of the hub shell 30 comprise flanges 306 having holes 308 angularly dispersed around the periphery. Spokes may be attached from the holes 308 to the wheel to transfer rotational movement of the hub shell 30 to the wheel in the conventional way.

An axle 34 coaxial to the central axis A is housed inside the axial hole 32. The shell 30 is mounted on the axle 34 via a pair of cartridge bearings 716 to provide near frictionless rotation of the hub shell 30 about the axle 34. Collars 750 may be mounted on the lateral ends of the axle 34 to axially fix the cartridge bearing, and therefore, the hub assembly components, in place.

A toothed engagement ring 704 is fixed internally on the inner peripheral surface 302 of the shell 30. Rotation of the toothed engagement ring 704 causes rotation of the hub shell. Each tooth 322 of the toothed engagement ring 704 is asymmetrical in the cross-sectional view, thereby forming a unidirectional toothed engagement ring 704. In other words, there is a gradual incline from the base of a first tooth to the tip of the first tooth and a sharp decline from the tip of the first tooth to the base of the next adjacent tooth, thereby forming an asymmetrical triangle, and preferably, a near right triangle. The retractable engagement member 700 engages the toothed engagement ring 704 on the sharp declining face. Rotational force by the retractable engagement member 700 on the sharp declining face of the toothed engagement ring 704 imparts a rotational force on the hub shell 30, thereby causing the hub shell 30 to rotate about the axle 34.

In some embodiments, the toothed engagement ring 704 may be attached to the inner peripheral surface 302 of the hub with its teeth 322 projecting radially inward. In some embodiments, the hub shell 30 may comprise an internal wall 706 surrounding the axle 34 and partially covering the axial hole 32 as shown in FIG. 12. The toothed engagement ring 704 may be attached to the internal wall 706 with its teeth 322 projecting axially outward toward the driver 42.

The driver 42 generates the rotational force on the toothed engagement ring 704. The driver 42 has a generally cylindrically shaped body and is also mounted on the axle 34 inside the axial hole 32. In some embodiments, a main spacer 708 is mounted directly on the axle 34. The main spacer 708 has a retraction device mounting side 712, upon which the retraction device 702 is mounted with slight frictional engagement.

The driver 42 may be operatively connected to a cassette body 714, which is also mounted on the axle 34 adjacent to the hub 30 via cartridge bearings 716 to provide near frictionless rotation of the cassette body 714 and the driver 42 about the axle 34. The driver 42 may, for example, comprise threads on the outer periphery to screw into the cassette body 714. A spacer 756 may be positioned between the cartridge bearings 716 to space them apart and restrict axial play. A gasket or seal 754 may be positioned between the hub 30 and the cassette 714 to prevent dirt and moisture from entering into the hub 30. The outer diameter of the seal 754 is sized to be slightly smaller than the inner perimeter of the hub shell 30 to avoid imparting frictional resistance on the hub shell 30. A clip 758, such as a circlip, may also be used to restrict axial movement of the cartridge bearing 716, while permitting rotation of the cartridge bearing 716. A circular groove may be tooled into the inner surface of the cassette body 714 to seat the clip 758.

Multi-speed cogs are mounted on the cassette body 714 to which a drive chain may be connected. The drive chain is also connected to a chain ring attached operatively connected to pedals such that rotation of the pedals in the forward direction causes the chain to move which leads to rotation of one of the cogs, thereby turning the cassette body 714 in the forward direction. Since the cassette body 714 is operatively connected to the driver 42, the driver 42 also turns in the forward direction. Forward direction is defined by the rotation required to drive the bicycle in a forward direction.

The driver 42 is operatively connected to a retractable engagement member 700 to engage the toothed engagement ring 704 of the hub 30, thereby creating forward rotation of the hub 30. In some embodiments, the retractable engagement member 700 is a plurality of pawls 44 angularly and intermittently dispersed around the outer periphery of the driver 42. The pawls 44 are biased outwards by individual pawl springs 718 mounted underneath each pawl 44 and buttressed against the outer surface of the driver 42. The driver 42 may have a plurality of cavities 427 angularly arranged about the external periphery of the driver 42. Each cavity 427 has an internal recession 428a formed at one end of the cavity into which one pawl 44 can fit. The cavity 427 provides a furrow into which the pawl 44 can retract during the disengaged configuration to avoid contact with the toothed engagement ring 704.

In some embodiments, the retractable engagement member 700 is a toothed disc as shown in FIG. 12. The toothed disc has a ring shaped body having teeth 322' arranged to reciprocate the teeth 322 arrangement of the toothed engagement ring 704 so as to form mating pairs. The toothed disc further comprises a slightly helical axial spline 720 angularly offset from the central axis A. In this embodiment, the driver 42 is a hollow cylinder comprising an inner surface 722 and an outer surface 724, wherein the inner surface 722 comprises an axial helical groove 726 that is angularly offset from the central axis A, and wherein the axial spline 720 fits inside the axial groove 726 to axially and rotatably move the toothed disc relative to the driver 42. Forward rotation of the driver 42 results in the retractable engagement member 700 rotating forward and moving axially away from the driver 42 and towards engagement with the toothed engagement ring 704 under the force provided by the spring 760, whereas reverse rotation of the driver 42 results in the retractable engagement member 700 rotating in reverse and moving axially towards the driver 42 and disengaging completely from the toothed engagement ring 704 as it rides over the teeth of the engagement ring 704.

To facilitate engagement in the forward direction, a spring 760, such as a coil spring, may be positioned between the toothed disc and the driver 42. The driver 42 may comprise a radially, inwardly projecting, circumferential flange 762 upon which the spring 760 can be abutted against to provide a biasing force on the toothed disc towards the toothed engagement ring 704.

To fully retract the engagement member 700 in the disengaged configuration a retraction device 702 is employed. The retraction device 702 is frictionally mounted on the axle 34 adjacent to the driver 42, wherein the driver 42, the retractable engagement member 700, and the retraction device 702 are arranged inside the hub 30 such that forward rotation of the driver 42 engages the retractable engagement member 700 with the toothed engagement ring 704 and wherein reverse rotation of the driver 42 completely disengages the retractable engagement member 700 from the toothed engagement ring 702.

The retraction device 702 comprises a retaining ring 728 mounted on the axle 34 adjacent to the driver 42 and a plurality of retraction members 730 intermittently and angularly spaced around an outer periphery of the retaining ring 728. Preferably, the retaining ring 728 is frictionally mounted on the axle 34 such that a small torsional resistance is imparted on the retaining ring 728 before rotating about the axle 34 in either direction. The torsional resistance on the retaining ring 728 should be sufficient to allow the retractable engagement member 700 to move axially under the influence of the retraction members 730 and compress the spring 760 and so fully move the retractable engagement member 700 away from the toothed engagement ring 704 before slipping on the axle under further back pedaling and similarly to allow the retractable engagement member 700 to move axially out from under the influence of the retraction members 730 when forward pedaling is again commenced.

Figure 11:
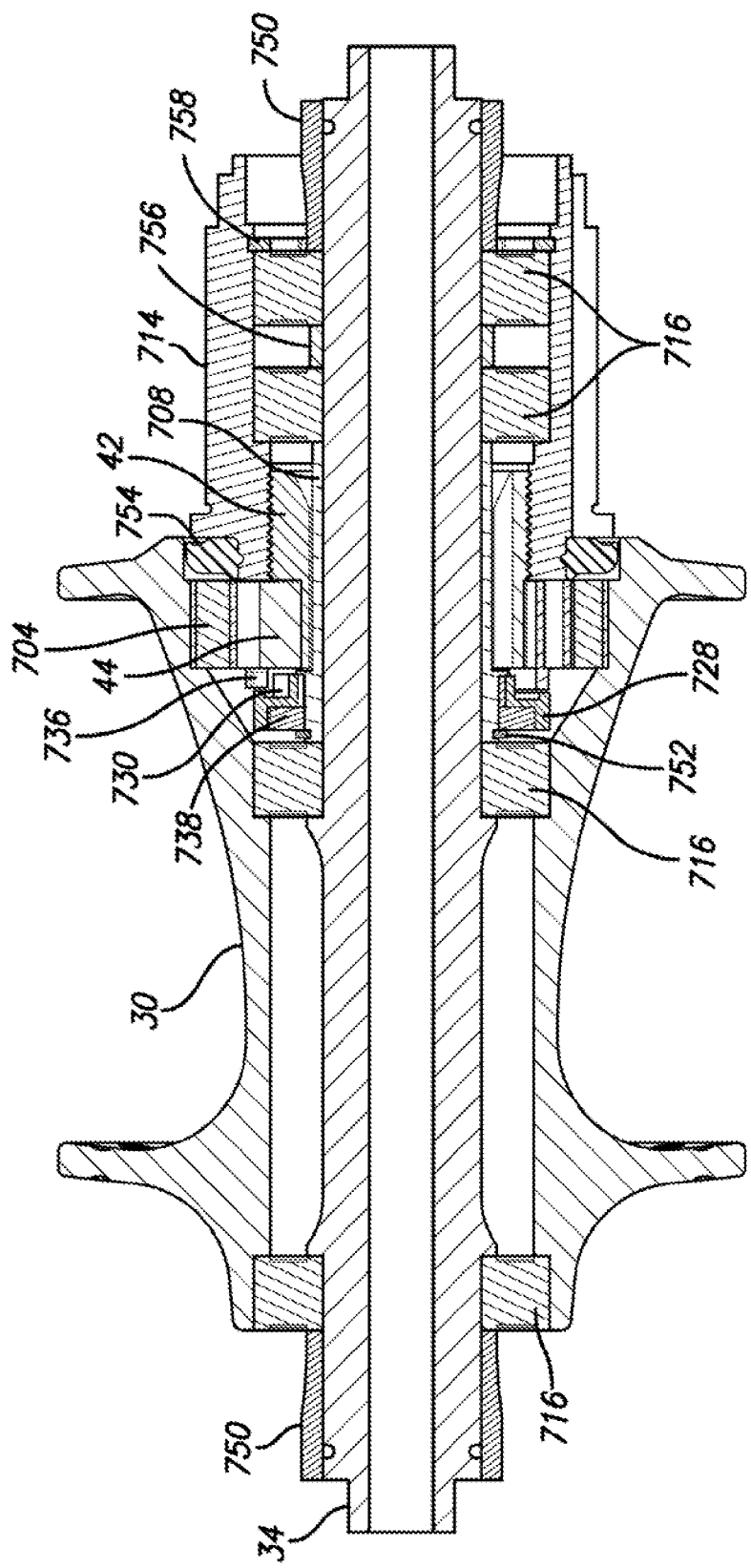
FIG. 11 shows a sectional view of the embodiment shown in FIG. 8.

In sonic embodiments, the torsional resistance may be created by abutting a wave spring 738 against the retaining ring 728 as shown in FIGS. 8 and 11. In some embodiments, the wave spring 738 may be axially fixed against a cylindrical clip 752, which may be fixed on the axle 34 in a groove. In some embodiments, the wave spring 738 may be positioned between the driver 42 and the retaining ring 728 to create an axial biasing force against the retaining ring 728. In some embodiments, the clip 752 may be mounted on the main spacer and buttressed against a bearing cartridge 716.

In some embodiments, each retraction member 730 protrudes outwards, either radially or axially, away from the retaining ring 728 at an angle. Preferably, the angle created between the retraction member 730 and the retaining ring 728 is between zero degrees and 90 degrees.

In some embodiments, as shown in FIG. 8, the retaining ring 728 may have an outer circumferential stop 732 and an inner circumferential flange 734 both protruding axially outward from the outer and inner periphery of the retaining ring 728, respectively, to form a retaining cup. The retraction members 730 may be embedded in the inner circumferential flange 734 with the retraction members 730 projecting radially outwardly at angle towards the outer circumferential stop 732. The retraction members 730 may be secondary springs and exert an outwardly biasing force against the circumferential stop 732. The circumferential stop 732, therefore, prevents the retraction members 730 from moving outward beyond a certain distance and interfering with the efficiency of drive.

In some embodiments, the retractable engagement member 700 also comprises a reciprocal retraction member 736 protruding outwardly and axially, away from the retractable engagement member 700, wherein forward rotation of the driver 42 engages the retractable engagement member 700 with the toothed engagement ring 704 and wherein reverse rotation of the driver 42 slides each reciprocal retraction member 736 of the retractable engagement member 700 underneath one of the retraction members 730 of the retaining ring 728, thereby retracting each retractable engagement member 700 and disengaging the retractable engagement member 700 from the toothed engagement ring 704.

By way of example only, in some embodiments, the retractable engagement members 700 are pawls 44. To accommodate retraction of the pawls 44, in some embodiments, each of the pawls 44 includes a pivot portion 441, a tip 443, and a reciprocal retraction member 736. Each of the pivot portions 441 is pivotably attached to the internal recessions 428a. Each of the tips 443 is connected with one of the pivot portions 441, engaging one of the teeth 322. Forward rotation of the driver causes the tips 443 of the pawls 44 to push against sidewalls of the teeth 322 to drive the shell 30 to rotate. Each of the reciprocal retraction members 736 is connected with one lateral side of one of the pivot portions 441 having a bevel 447.

Springs 718 press against the tips 443 of the pawls 44 in such a way that the tips 443 can be pushed against the sidewalls of the indentations 322. It is important to note that each pawl 44 has a curved tip 443 that engages with the mating curved "teeth" 322 of the hub's engagement ring 704.

When in use, as the rider pedals forward the driver 42 is driven in a clockwise direction. The springs 718 under the pawls 44 bias them outward and each pawl 44 is driven against the driving faces of the engagement ring 704 at which point drive is achieved. The hub 30 will continue to transfer drive in a conventional manner as long as the driver 42 is being driven forward at a higher rate than the rotational speed of the wheel. Due to the unique geometry of the curved tip and mating curved engagement ring tooth profile, once partially engaged each pawl 44 will tend to move fully outward to the total extent of its travel. This ensures that each of the unique reciprocal retraction member 736 will be fully clear of the array of retraction members 730 found in the retaining cup 728.

When the rider stops pedaling the pawls 44 will become stationary relative to the axle. At this time the pawls 44 may or may not be radially aligned with one set of the retraction members 730 which act as secondary springs. In the condition that they are not aligned (which is most likely to be the common outcome) then the pawls 44 will oscillate radially in an ordinary manner and energy will be conventionally "lost" from the system in the form of heat and noise as the springs 718 under the ratchet attempt to hold the pawls 44 against the passing engagement ring teeth 322. In the condition that the pawls 44 are aligned with a set of the retraction members 730, the pawls 44 will oscillate radially in the conventional manor and energy will be lost, but this energy will be greater as both the primary springs 718 and retraction members 730 acting as springs will attempt to bias the pawls 44 outward with greater combined force and therefore greater losses. However, in this condition each movement of the pawl 44 will create a resultant thrust and vibration that will tend to drive the retraction device assembly 702 onwards in a clockwise rotation until the retraction members 730 no longer bear on each pawl 44 and losses drop to the normal level. Thus, in summary, a rider may pedal and coast in entirely the same way that a standard ratchet mechanism works.

However, when the rider has stopped pedaling and he or she reverses or backpedals slightly, the retraction device will operate. As the rider backpedals, the pawls 44 that are riding over the teeth 322 of the engagement ring 704 will spend the majority of their time so the reciprocal retraction member 736 sweeps the volume of space occupied by the retraction members 730 in a counter-clockwise direction. In this direction, the sharp tip of the reciprocal retraction member 736 can catch under the opposing retraction members 730 of the retaining cup 728 and can be driven radially inwards as the top of the reciprocal retraction member slides under the retraction members 730. The retraction members 730 cannot be forced outwards because it rests under the lip 732 of the retaining cup 728. When the pawl 44 has been fully retracted and is no longer bearing against the engagement ring 704, any continued backpedaling motion will simply drive the retaining cup 728 backward in synchronization with the driver 42. In this condition, the drive mechanism will be entirely disengaged and the wheel will spin freely and silently without any energy loses due to the drive mechanism.

When the rider chooses to reintroduce energy into the system, forward motion of the driver 42 will allow the reciprocal retraction members 736 on the sides of the pawls 44 to move outward from under the retraction members 730 in the retaining cup 728, as the retraction device assembly 702 is held in light frictional engagement to the axle. When the pawls 44 move outward, they will become free to operate under their conventional range of motion and can now continue in pedal-based driving engagement as before.

In some embodiments, as shown in FIGS. 12-15, the retractable engagement member may be a toothed disc. The retraction members 730 may be embedded intermittently and angularly spaced around the medial surface of the retaining ring 728 with each retraction member 730 protruding axially away from the medial surface at an angle between zero degrees and ninety degrees relative to the medial surface of the retaining ring 728, wherein forward rotation of the driver 42 engages the retractable engagement member 700 with the toothed engagement ring 704 and wherein reverse rotation of the driver 42 slides each reciprocal retraction member 736 of the retractable engagement member 700 underneath one of the retraction members 730 of the retraction device 702, thereby maintaining an axially retracted or disengaged configuration of the retractable engagement member 700 relative to the toothed engagement ring 704.

The lateral side of the retractable engagement member 700 is also fitted with reciprocal retraction members 736 that work in an axial arrangement rather than a radial one. The freewheeling of the hub 30 brings these reciprocal retraction members 736 within range of a set of retraction members 730 mounted to the retaining ring 728 which is free to rotate around the axle 34 of the hub 30, albeit against a frictional (drag) force induced by a wave spring 738.

In this embodiment, as the rider backpedals the retraction members 730 engage the reciprocal retraction members 736 on the back of the tooth-disc and pull it fully away from the toothed engagement ring 704 fitted to the inside of the hub 30, and therefore eliminating freewheel drag.

In some embodiments, this arrangement could be reversed and instead the retraction members 730 could be fitted to the driver 42 with the reciprocal retraction members 736 fitted to the retraction device 728, which is frictionally biased to the axle.

Similarly one could instead use rigid reciprocal retraction members 736 on the back of the engagement member 700 and rigid retraction members 730 on the retraction device 728 and allow the wave spring 738, which adds the frictional resistance to the retraction members 730, to also provide the spring element that allows the retractable engagement member 700 to move out of the way in the event that freewheeling commences when there is radial alignment between the fins on the drive disc and the reciprocal retraction members 736 on the retraction members 730. In all these examples there would need to be a spring and a positive stop to prevent the retraction device moving into the space swept by the reciprocal retraction members 736 during drive.

During pedaling, the reciprocal retraction members 736 move out from behind the retraction members 730 and the wave spring 738 biases the retractable engagement member 700 against the toothed engagement ring 704 in the hub shell 30. As drive is engaged, the slight helical nature of the spline 720 in which the toothed disc runs, combined with the overhanging shape of the drive disc teeth, pulls the disc into full engagement and therefore the reciprocal retraction members 736 on the backside of the drive disc are pulled fully away from the retraction device.

Example

The pawl embodiment of new design describes a ratchet ring comprising 24 engagement teeth (such as a typical Shimano Dura-Ace hub). At a speed of 25 mph (approximately 11 m/s) a class 700c road bicycle wheel will rotate 5 times per second. This means that in one second 120 teeth will move past each ratchet pawl when the driver is stationary (not pedaling). In other words, it will take 0.0083 seconds for each pawl to get from one tooth to the next.

Again when looking, at this embodiment, if a ratchet ring tooth height of 2 mm is assumed along with an approximately even transition from the root of the tooth to its tip, then in the slack period between teeth, meaning as the pawl approaches the top of the tooth (sliding up the backside ramp) it is reasonable to approximate the pawl's inward radial velocity as 2 mm per 0.0083 seconds. This also equates to 240 mm/second or 0.24 m/s. So as the tip of a tooth passes, the pawl can be expected to be set-off on a radially inward path at this rate.

While still looking at the pawl embodiment, if a fairly constant pawl spring force of 0.3 newtons (N) is assumed (the ordinary Shimano Dura-Ace pawls examined give spring forces of approximately 0.2, 0.3 and 0.4N), and each pawl has an equivalent weight of 1 g acting at the tip, then from the formula force=mass×acceleration (F=ma) the expected acceleration of the pawl under the action of the spring (once the pawl has moved clear of the tooth) would be: $0.3=0.001 \times a$; $a=300$ m/s/s. So, as the tip of each ratchet tooth passes, the pawl will be moving radially inward at 0.24 m/s and accelerating (decelerating initially) outward at 300 m/s/s. So, to simply return to the height of the tip of the tooth will take 0.0016 seconds. The pawl can now begin moving out into the trough between ratchet teeth, though of course this trough is getting shallower as the wheel continues to rotate.

If an iterative approach is taken, in the next 0.0026 seconds the mid point of the gap between tooth faces will be reached. In that time the pawl will move outwards according to the formula $s=ut+\frac{1}{2}at^2$, where u is the speed of radial retraction, t is the time, and a is the acceleration. Therefore, $s=0.24 \times 0.0026+0.5 \times 300 \times 0.0026 \times 0.0026=0.001638$, which is 1.64 mm. This means that the pawl will have sprung fully back out to the ratchet ring well before the trough is half way past, which leaves very little relative (float) of the pawls when freewheeling to use to ensure that the fins are in range of the retraction springs.

If the pawl spring strength is reduced from 0.3N to 0.2N: In the formula listed earlier, "a" becomes 200 m/s/s. So, the time taken to return to the height of the ratchet tooth becomes 0.0024 seconds. By the mid point of the trough (which will now pass just 0.00177 seconds after that) $s=0.24 \times 0.00177+0.5 \times 200 \times 0.00177 \times 0.00177=0.000738$, which is 0.74 mm. This means that the pawl will not have sprung fully back out to meet the ratchet ring by the time it is mid way between teeth, and at this speed (25 mph) the pawls will float over the ring with the fins of the pawls never rising above the tips of the pawl retraction springs alongside. Therefore at this speed and above, back-pedaling will always result in the retraction of the pawls and a zero drag configuration. At very low speeds back-pedaling may allow the pawls to drop fully into the troughs between teeth and avoid being "caught" by the retraction device on the first pass, but further rotations are likely to see a "catch" eventually. At the speeds for which the hub is designed, a "catch" should occur first time.

It is important to highlight the subtle nature of the invention and how it might be applied, to other existing hub designs. While hubs have already been made that can retract the pawls under back-pedaling or automatically while freewheeling, the unique mechanisms in these prior hubs worked upon relative movement between driver and hub to provide "drag" to operate the retraction mechanism. This therefore adds very significant drag under freewheeling that would likely be greater than the pawl drag thus eliminated and would therefore not be acceptable in competition or sustained leisure use.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A bicycle hub assembly, comprising:
   a. a hub comprising a central axis, an outer peripheral surface, and an inner peripheral surface defining an axial hole, wherein the hub runs near frictionlessly on an axle coaxial to the central axis, the axle inserted in the axial hole;
   b. a toothed engagement ring fitted inside the axial hole of the hub;
   c. a driver mounted to the axle, wherein the driver is a cup-shaped disc comprising an inner surface and an outer surface, wherein the inner surface comprises an axial groove that is angularly offset from the axle;
   d. a toothed disc operatively connected to the driver, the toothed disc comprising an axial spline angularly offset from the central axis, wherein the axial spline fits inside the axial groove to axially and rotatably move the toothed disc relative to the driver; and
   e. a retraction device, frictionally mounted on the axle adjacent to the driver, the retraction device comprising:
      i. a retaining ring comprising a medial surface and a lateral surface opposite the medial surface, the retaining ring mounted on the axle and housed inside the driver,
      ii. a plurality of retraction members intermittently and angularly spaced around the medial surface of the retaining ring, each retraction member protruding axially away from the medial surface at an angle between zero degrees and ninety degrees relative to the medial surface of the retaining ring,
   f. wherein the driver, the toothed disc, and the retraction device are arranged inside the hub such that forward rotation of the driver engages the toothed disc with the toothed engagement ring, and
   g. wherein the toothed disc further comprises a plurality of reciprocal retraction members protruding axially away from the toothed disc towards the driver, wherein reverse rotation of the driver slides each reciprocal retraction member underneath one of the retraction members, thereby retracting the toothed disc axially away from the toothed engagement ring, thereby disengaging the toothed disc from the toothed engagement ring.

2. A bicycle hub assembly, comprising:
 a. a hub comprising a central axis, an outer peripheral surface, and an inner peripheral surface defining an axial hole, wherein the hub runs near frictionlessly on an axle coaxial to the central axis, the axle inserted in the axial hole;
 b. a toothed engagement ring fitted inside the axial hole of the hub;
 c. a driver mounted to the axle; and
 d. a retractable engagement member operatively connected to the driver,
 e. wherein the driver and the retractable engagement member are arranged inside the hub such that forward rotation of the driver engages the retractable engagement member with the toothed engagement ring and wherein reverse rotation of the driver completely disengages the retractable engagement member from the toothed engagement ring, wherein the retractable engagement member is a toothed disc, and wherein the toothed disc further comprises an axial spline angularly offset from the central axis and wherein the driver is a cup-shaped disc comprising an inner surface and an outer surface, wherein the inner surface comprises an axial groove that is angularly offset from the axle, and wherein the axial spline fits inside the axial groove to axially and rotatably move the toothed disc relative to the driver.

3. The bicycle hub assembly of claim 2, further comprising a retraction device frictionally mounted on the axle adjacent to the driver, the retraction device comprising:
 a. a retaining ring comprising a medial surface and a lateral surface opposite the medial surface, the retaining ring mounted on the axle and housed inside the driver,
 b. a plurality of retraction members intermittently and angularly spaced around the medial surface of the retaining ring, each retraction member protruding axially away from the medial surface at an angle between zero degrees and ninety degrees relative to the medial surface of the retaining ring,
 c. wherein the toothed disc further comprises a reciprocal retraction member protruding axially away from the toothed disc towards the driver,
 d. wherein forward rotation of the driver engages the toothed disc with the toothed engagement ring and wherein reverse rotation of the driver slides each reciprocal retraction member underneath one of the retraction members, thereby retracting the toothed disc axially away from the toothed engagement ring, thereby disengaging the toothed disc from the toothed engagement ring.

4. The bicycle hub assembly of claim 3, wherein the retraction member is a spring element.

5. The bicycle hub assembly of claim 4, further comprising a wave spring biased against the retaining ring to provide frictional resistance on the retaining ring.

6. The bicycle hub assembly of claim 5, further comprising a coil spring lateral to the toothed disc to provide a biasing force on the toothed disc axially toward the toothed engagement ring.

7. A bicycle hub assembly, comprising:
 a. a hub comprising a central axis, an outer peripheral surface, and an inner peripheral surface defining an axial hole, wherein the hub runs near frictionlessly on an axle coaxial to the central axis, the axle inserted in the axial hole;
 b. a toothed engagement ring fitted inside the axial hole of the hub;
 c. a driver mounted to the axle;
 d. a retractable engagement member operatively connected to the driver; and
 e. a retraction device frictionally mounted on the axle adjacent to the driver,
 f. wherein the driver, the retraction device, and the retractable engagement member are arranged inside the hub such that forward rotation of the driver engages the retractable engagement member with the toothed engagement ring and wherein reverse rotation of the driver completely disengages the retractable engagement member from the toothed engagement ring, and
 g. wherein the retraction device, comprises:
  i. a retaining ring mounted on the axle and housed inside the driver; and
  ii. at least one retraction member protruding from the retaining ring.

8. The bicycle hub assembly of claim 7, wherein the retractable engagement member comprises at least one reciprocal retraction member protruding axially away from the retractable engagement member towards the driver, wherein forward rotation of the driver engages the retractable engagement member with the toothed engagement ring and wherein reverse rotation of the driver slides the at least one reciprocal retraction member underneath the at least one retraction member, thereby retracting the retractable engagement member axially away from the toothed engagement ring, thereby disengaging the retractable engagement member from the toothed engagement ring.

9. The bicycle hub assembly of claim 7, wherein the at least one retraction member is a spring element.

10. The bicycle hub assembly of claim 7, further comprising a wave spring biased against the retaining ring to provide frictional resistance on the retaining ring.

11. The bicycle hub assembly of claim 7, further comprising a coil spring lateral to the retractable engagement member to provide a biasing force on the retractable engagement member axially toward the toothed engagement ring.

12. A bicycle hub assembly, comprising:
 a. a hub comprising a central axis, an outer peripheral surface, and an inner peripheral surface defining an axial hole, wherein the hub runs near frictionlessly on an axle coaxial to the central axis, the axle inserted in the axial hole;
 b. a toothed engagement ring fitted inside the axial hole of the hub;
 c. a driver mounted to the axle;
 d. a retractable engagement member operatively connected to the driver; and
 e. a retraction device frictionally mounted on the axle adjacent to the driver,
 f. wherein the driver, the retraction device, and the retractable engagement member are arranged inside the hub such that forward rotation of the driver engages the retractable engagement member with the toothed engagement ring and wherein reverse rotation of the driver completely disengages the retractable engagement member from the toothed engagement ring, and
 g. wherein the retractable engagement member further comprises an axial spline angularly offset from the central axis and wherein the driver is a cup-shaped disc comprising an inner surface and an outer surface, wherein the inner surface comprises an axial groove that is angularly offset from the axle, and wherein the axial spline fits inside the axial groove to axially and rotatably move the retractable engagement member relative to the driver.

13. A method of near frictionless coasting, comprising:
a. providing an axle having a central axis; a hub coaxially mounted on the axle, the hub comprising an outer peripheral surface and an inner peripheral surface defining an axial hole, wherein the hub runs near frictionlessly on the axle; a toothed engagement ring fitted inside the axial hole of the hub; a driver mounted to the axle; a retractable engagement member operatively connected to the driver; and a retraction device frictionally mounted on the axle adjacent to the driver;
b. rotating the driver in a first direction to axially move the retractable engagement member towards the toothed engagement ring; and
c. reversing the direction of the driver to distance the retractable engagement member from the toothed engagement ring,
d. wherein reversing the direction of the driver axially retracts the retractable engagement member by sliding the retractable engagement member axially into the driver, and
e. wherein the retraction device, comprises:
   i. a retaining ring comprising a medial surface and a lateral surface opposite the medial surface, the retaining ring mounted on the axle and housed inside the driver; and
   ii. a plurality of retraction members intermittently and angularly spaced around the medial surface of the retaining ring, each retraction member protruding axially away from the medial surface at an angle between zero degrees and ninety degrees relative to the medial surface of the retaining ring,
   iii. wherein the retractable engagement member further comprises a plurality of reciprocal retraction members protruding axially away from the retractable engagement member towards the driver,
   iv. wherein forward rotation of the driver engages the retractable engagement member with the toothed engagement ring and wherein reverse rotation of the driver slides each reciprocal retraction member underneath one of the retraction members, thereby retracting the retractable engagement member axially away from the toothed engagement ring, thereby disengaging the retractable engagement member from the toothed engagement ring.

14. The method of claim 13, wherein the axially retracted state is maintained by sliding a reciprocal retraction member axially protruding from the retractable engagement member in a first direction underneath a retraction member protruding axially from the retraction device.

15. The method of claim 13, wherein the retractable engagement member is a toothed disc.

* * * * *